United States Patent [19]
Suchowski et al.

[11] 3,994,262
[45] Nov. 30, 1976

[54] PLAY APPARATUS FOR ANIMAL PETS

[75] Inventors: Bernard Suchowski, Marlboro; David D. Lovitz, Short Hills; Claud W. Kissin, Fort Lee, all of N.J.

[73] Assignee: The Hartz Mountain Corporation, N.J.

[22] Filed: Jan. 30, 1975

[21] Appl. No.: 545,427

[52] U.S. Cl. .................................. 119/29; 119/17
[51] Int. Cl.² .......................................... A01K 1/03
[58] Field of Search .............. 119/15, 17, 18, 1, 29; D30/6

[56] References Cited
UNITED STATES PATENTS

| | | | |
|---|---|---|---|
| 1,887,869 | 11/1932 | Clampitt | 119/17 |
| 2,068,210 | 1/1937 | Walker | 119/18 |
| 3,785,347 | 1/1974 | Dinnerstein | 119/29 |

Primary Examiner—Louis G. Mancene
Assistant Examiner—Peter K. Skiff
Attorney, Agent, or Firm—Davis, Hoxie, Faithfull & Hapgood

[57] ABSTRACT

An animal play apparatus, adapted for use with or without an animal play enclosure with towers, having one or more rotatable housings. Each of the housings has a doorway and is rotatably mounted on a bracket having two arms connected by a base which has a port therein in congruent relation to the gate when the housing is in a predetermined operative position. Each bracket is adapted for connection with said towers, whereby there is communication between the interior of the enclosure and that of the housing when the latter is in its operative position. The arms of each bracket have a releasable lock operatively engageable with the corresponding rotatable housing.

10 Claims, 13 Drawing Figures

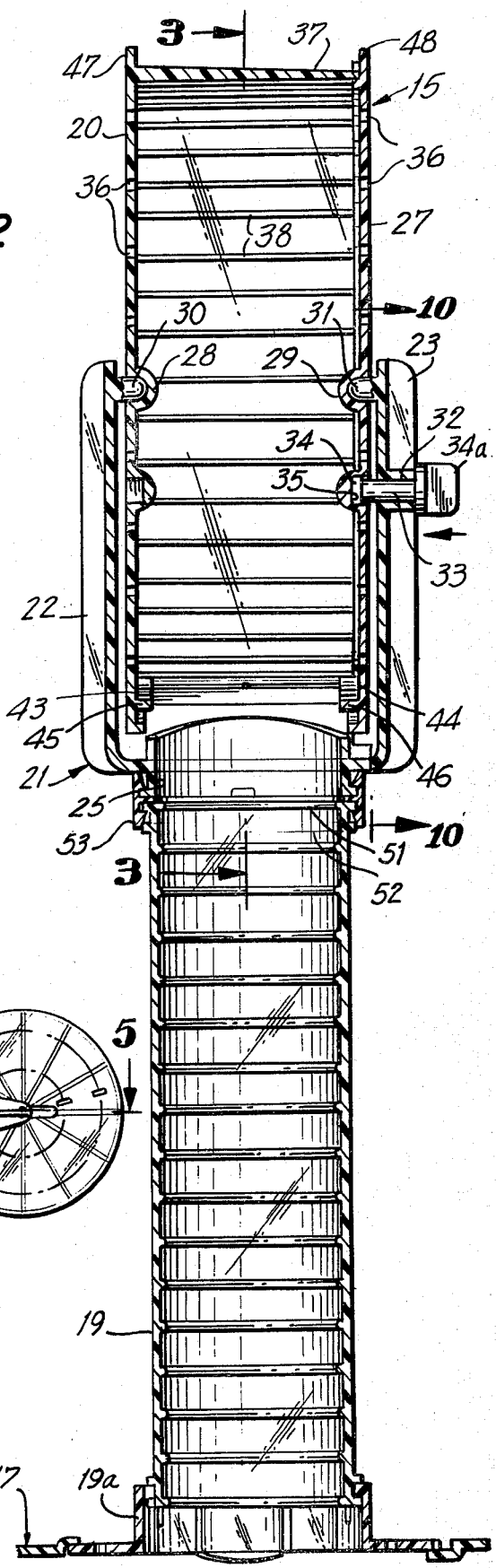
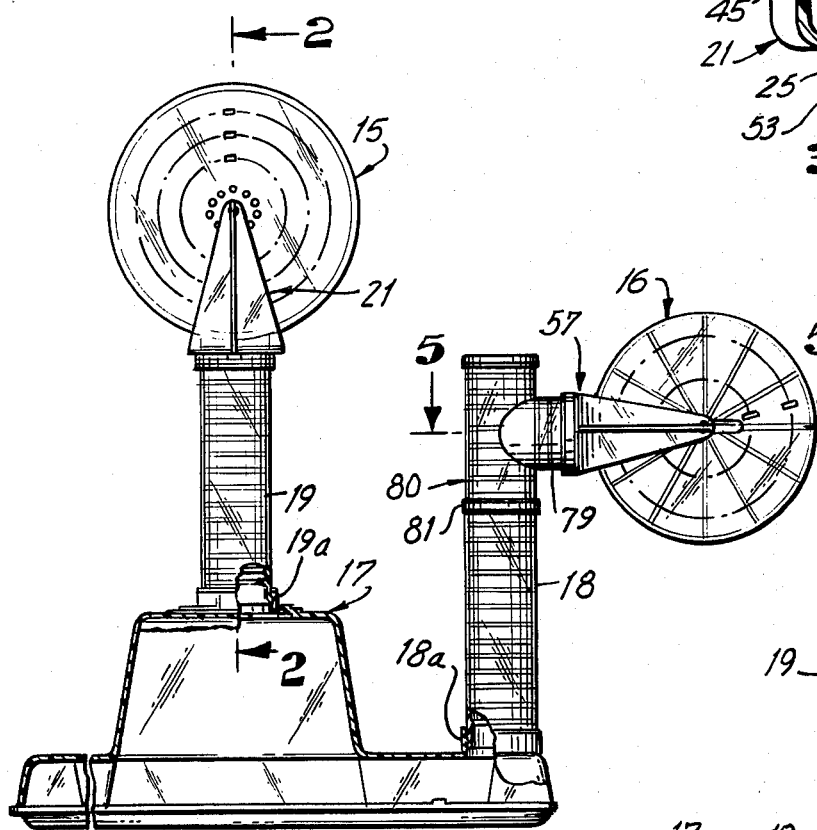
FIG. 1
FIG. 2

PLAY APPARATUS FOR ANIMAL PETS

BACKGROUND OF THE INVENTION

1. The Field of the Invention

This invention relates to play apparatus for small animal pets, such as hamsters and gerbils, and is particularly directed to rotatably mounted housing adapted for independent use or for coactive use with animal play enclosures having tower members, like the device disclosed in U.S. patent application Ser. No. 418,281, which matured into U.S. Pat. No. 3,865,082.

2. The Known Art

Animal playground devices are widely used, certain of these being adapted for receiving various accessories, such as towers, tunnels and supplementary housings. While these provide varieties of combinations and offer interesting play opportunities for both children and the animals, most of the known devices are mainly static, resulting in early loss of interest as play devices. Despite the general acceptance evinced by pet owners of devices of this category, the known art does not disclose any rotary housings for pets that may, if desired, be used independently, or in conjunction with enclosures, especially those with towers, in such a way as to enable a pet within such an enclosure to have ready access to one or more rotary housings attached to the body of the enclosure or to said towers. Nor are there any known rotary housings for small pets having the above features that provide readily manipulable closures for gates providing ready access to and egress from the housing, and releasable stop means for holding the housing against rotation.

OBJECTIVES OF THIS INVENTION

It is the object of this invention to provide rotatable play apparatus having none of the shortcomings and limitations of known devices of this class and that offer healthy play opportunities for animals through the exercise of their rotating these housings by treadmill action. Other objects are the provision of means for ready attachment of said housings to existing enclosures, especially those with towers, means for enabling pets within one of said enclosures to have ready access to and egress from one or more of said housings, readily accessible manual means for releasably locking the housing against rotation, closure means for enabling the pet to be confined within the housing and readily released therefrom, and means for employing said apparatus as independent pet play devices that can be set upon a table or any other flat surface. And it is another objective to provide a device with the above-mentioned features that can be readily fabricated by plastic moulding processes so as to produce a low-cost device.

Other objects, features and advantages will appear from the drawings and the description hereafter given.

SUMMARY OF THE INVENTION

This invention comprises one or more rotatable ventilated housings, each supported by a bracket having an open port therein, each housing having a doorway and a door operatively associated therewith, said port and doorway being proportioned and positioned for operative intercommunication when the housing is in a predetermined relation to said bracket. In the preferred embodiment the housing and bracket have coactive manually disengageable stop means for releasably holding said housing in said operative intercommunicating position—and, in one form thereof, also in a predetermined inoperative position. Said port is provided with a connector for releasable connection with a coactively proportioned port of a channel associated with an animal enclosure whereby, when the ports of said housing and enclosure are in operative alignment, there will be an open passageway for the animal to move between the interior of said enclosure and that of said rotatable housing. When the door is closed, access to said housing will be prevented; and when an animal is within said rotatable housing, the door will prevent the animal's egress.

In the preferred construction, said port has a base portion in one plane, so as to enable it to rest on a flat surface like a table, whereby the bracket rotatably supporting the housing is in upright relation to said surface.

DESCRIPTION OF THE DRAWINGS

FIG. 1. is a side elevation showing two rotatable housings according to this invention operatively mounted on an animal enclosure provided with tower members, parts being broken away for clarity.

FIG. 2 is an enlarged fragmentary section of FIG. 1 taken along line 2—2, with the door of the housing in open position and the locking pin operatively engaged position.

FIG. 7 is an enlarged fragmentary section of FIG. 9 taken along line 7—7 showing the door operatively in place.

FIG. 8 is an end elevation showing the cylindrical embodiment detached from the tower of FIG. 1 and positioned on a flat surface.

FIG. 9 is a front elevation showing the globular embodiment detached from the tower assembly of FIG. 1 positioned on a flat surface.

DESCRIPTION OF PREFERRED EMBODIMENTS

Figure 3:
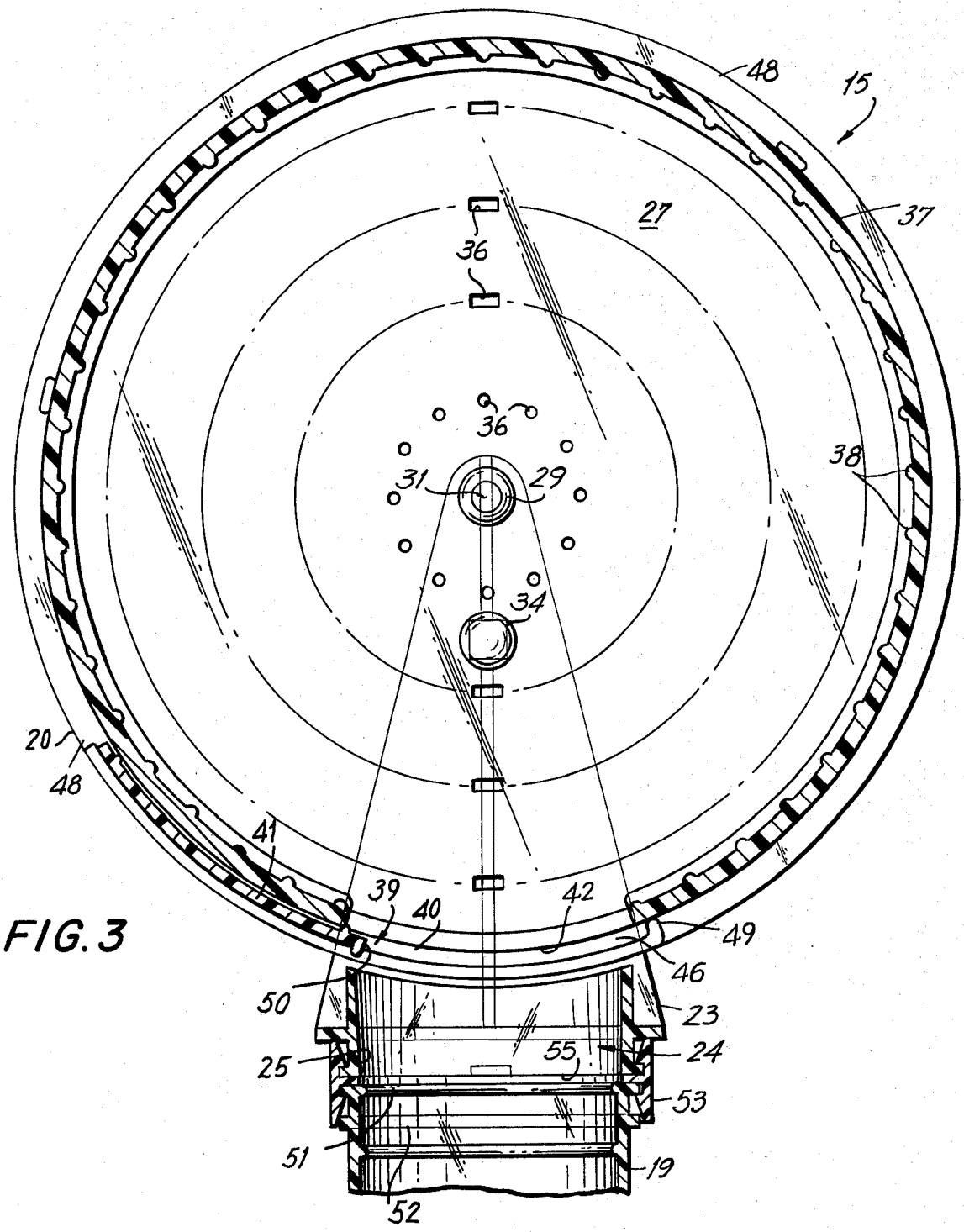
FIG. 3 is a fragmentary section of FIG. 2 taken along line 3—3.

FIG. 1 shows two forms of this invention, generally designated as cylindrical unit 15 and globular unit 16, each being shown mounted on the animal playground enclosure generally designated 17 having the tower members 18 and 19. The material of said unit 15 and 16 and said enclosure 17 is preferably transparent plastic. The said enclosure is similar to the housing disclosed in said prior application Ser. No. 418,281 and is illustrated here merely as an example of a pet animal enclosure to which the said devices 15 and 16 of this invention may be operatively connected. In the claims of this specification the term "channel members" refers to said towers 18 and 19 as well as to the respective apertured portions 18a and 19a of the enclosure 17 to which said respective towers are attached.

Figure 4:
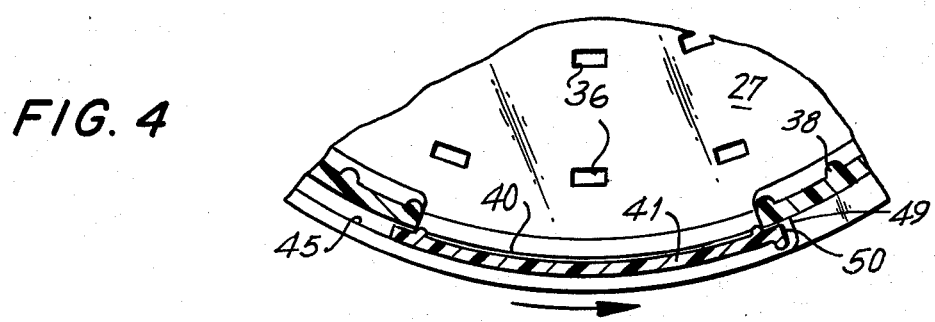
FIG. 4 is a fragmentary section like a portion of FIG. 3 showing the door in its closed position.

The said unit 15 comprises the cylindrical housing 20 rotatably mounted on the bracket 21 having oppositely disposed arms 22 and 23 joined to a base 24 having an open port 25 therein. The opposite lateral walls 26 and 27 of the housing 20 have the respective axial recessed portions 28 and 29 into which extend the respective pins 30 and 31 at the respective extremities of the said arms 22 and 23, whereby the housing 20 can be rotated to different selected positions with respect to said bracket 21. The bracket arm 23 has an apertured portion 32 therein slidably supporting the locking pin 33 the inner terminal 34 thereof being proportioned and positioned for releasable interengagement with the recessed locking portion 35 in said wall 27, the outer portion of said pin having the finger-grasping knob 34a. The said lateral walls 26 and 27 have a plurality of ventilating apertures 36 therein; and the cylindrical wall 37 flanked by said lateral walls 26 and 27 has on the inner surface thereof a plurality of spaced parellel ribs 38 providing gripping means to enable an animal within the housing to cause it to revolve by a climbing action on successive ribs. The said cylindrical wall 37 has a gate generally designated 39 and comprising an apertured portion 40 and closure 41. In this embodiment the said closure 41 is slidably mounted on the outer surface 42 of the cylindrical wall 37, the laterally opposite edges 43 and 44 of the closure being in slidable engagement with the respective laterally opposite tracks 45 and 46 on the outwardly extending peripheral rims 47 and 48 of said respective lateral walls 26 and 27. Each of said tracks has a stop element 49 for limiting the closing position of said closure, the leading edge 50 of said closure being engageable with said stop element when the door is in its fully closed position over said apertured portion 40, as shown in FIG. 4.

As shown in FIGS. 1 and 2, the bracket 21 is mounted upon the tower 19 which is connected to the short channel 19a at the upper portion of the enclosure 17 and is in communication with the interior thereof. At the top of said tower 19 is its terminal port 51 which is part of the tower's interior channel portion and is proportioned and adapted for positioning in congruent relation to said port 25 of said bracket 21 as shown in FIGS. 2 and 3. Said ports 25 and 51 are each provided with bayonet terminal portions of conventional construction and connected by the detachable bayonet connector collar 53 of the known construction the details of which are not shown since they are well known to those skilled in the art.

The arrangement is such that when the doorway 39 is in its open position, as shown in FIG. 3, the interior of said revolvable housing 20 is in communication, through the doorway 39, with the interior of the enclosure 17 through the latter's tower 19. When the said locking pin 33 is operatively retracted and the housing 20 operatively rotated, the door 41 can be operatively moved to its closed position shown in FIG. 4, whereby egress of an animal that had climbed up said tower 19 into the housing 20 will be prevented; and the animal will, by a treadmill action, cause the housing to revolve while the unit 15 is mounted on said enclosure member 17. Should it be desired to remove the unit 15 from said enclosure 17, the bayonet collar 53 is operatively disconnected from the two ports 25 and 51, whereupon the unit 15 is transferred to a flat surface 54 (FIG. 8), the bottom 55 of the base 24 being in one plane.

The said globular unit 16 is based substantially upon the same concept as the said cylindrical unit 15. It comprises a spherical housing 56 rotatably mounted on the bracket 57 having the oppositely disposed arcuate arms 58 and 59 joined to an annular flat-bottomed base generally designated 60 having the open port 61 therein. At diametrically opposite portions of the spherical housing 56 are two axial recessed portions 62 and 63 into which extend the respective pins 64 and 65 at the respective extremities of said arms 58 and 59, providing a rotatable support for the housing. The bracket arm 59 has an apertured portion 66 therein retractably supporting the locking pin 67 the inner terminal 68 of which is proportioned and positioned for releasable interengagement with either of the two recessed locking sections 69 and 70 formed within the spherical wall of the housing on opposite sides of said recessed portion 63, the outer end of said pin 67 having the manually manipulable knob 71. Said locking pin 67 is in operable engagement with recessed portion 69 when the housing is in operative communication with an associated animal enclosure, and with recessed portion 70 when the housing is 180° therefrom, as will more clearly hereinafter appear. The wall of housing 16 has a plurality of ventilating apertures 72 and a doorway 73 comprising the apertured portion 74 and a separable door 75 therefor, the respective peripheries 76 and 77 of said apertured portion and door being of conventional coactive bayonet construction permitting, in known manner, the attachment and detachment of the door by a twisting motion applied manually to the gripping ribs 78 thereof.

Figure 5:
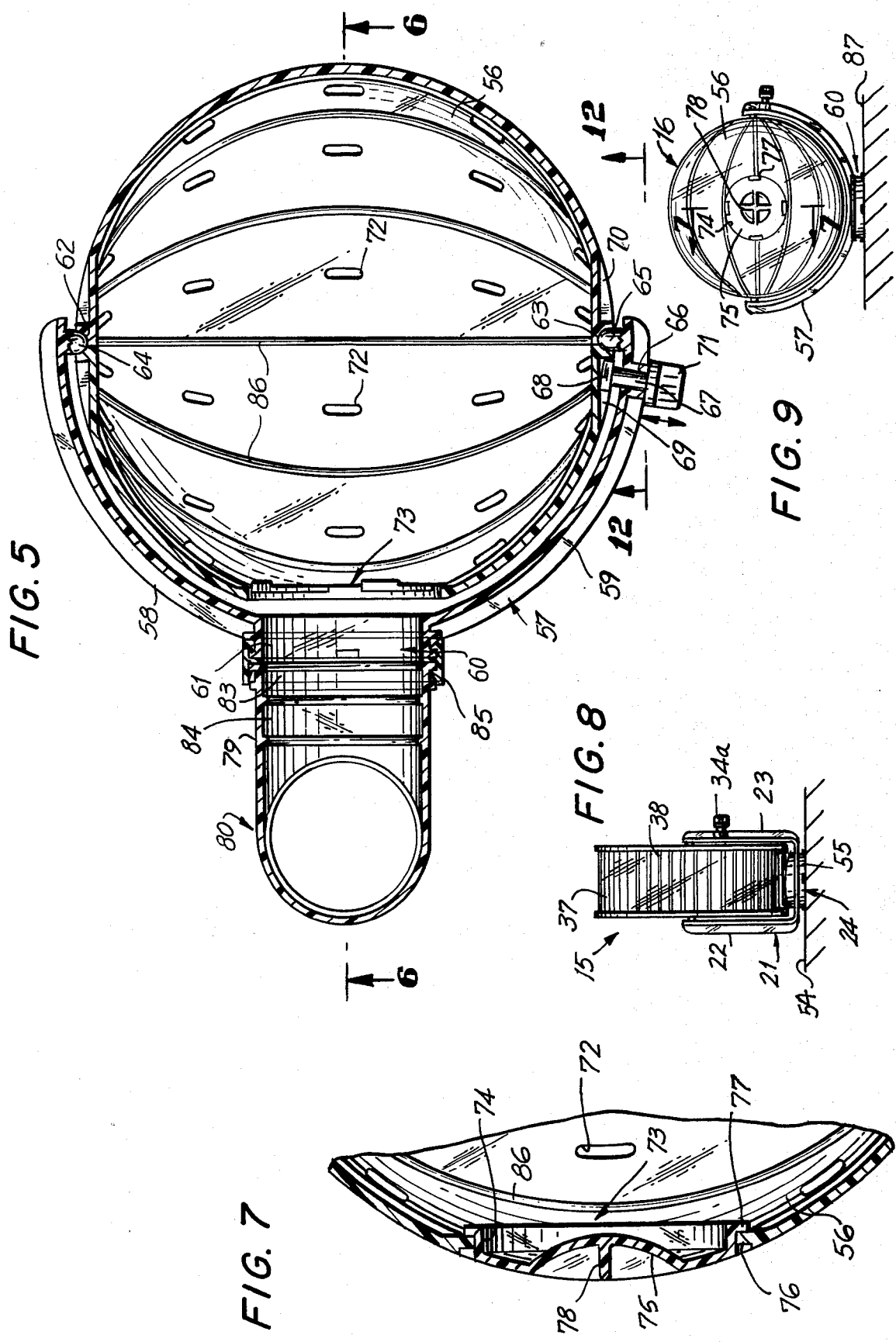
FIG. 5 is a fragmentary section of FIG. 1 taken along line 5—5, showing the door open and the locking pin in operative position.
Figure 6:
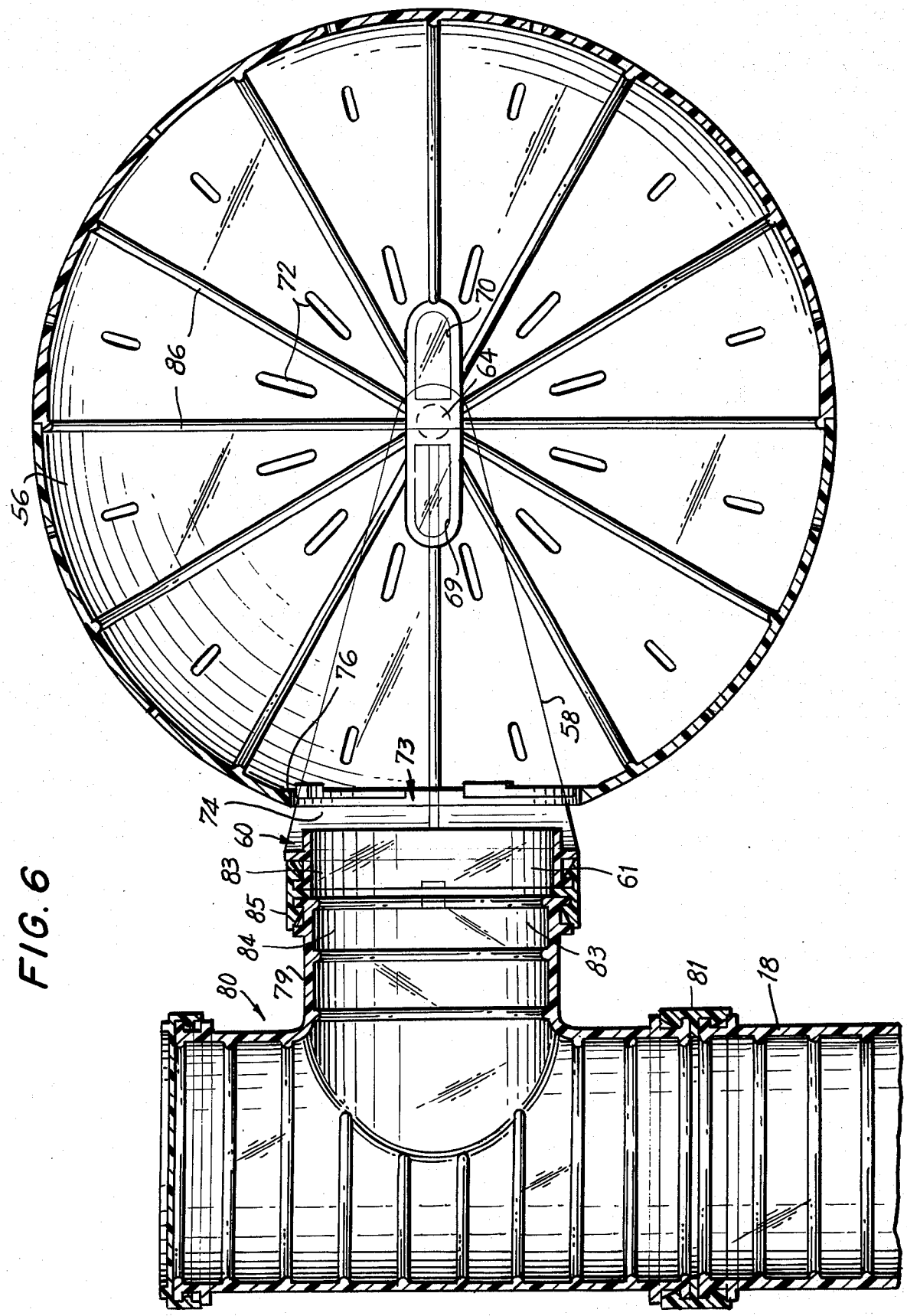
FIG. 6 is an enlarged fragmentary section of FIG. 5 taken along line 6—6.
Figure 10:
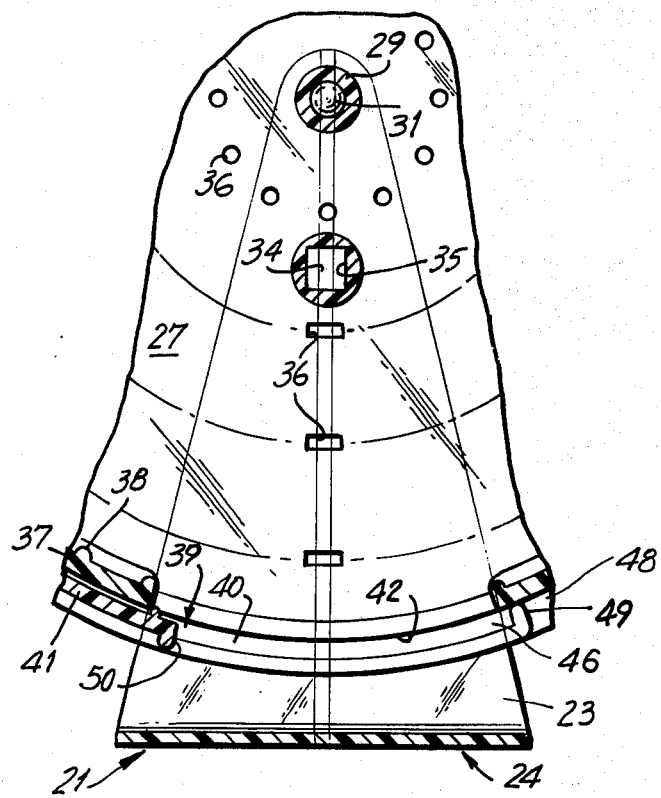
FIG. 10 is a fragmentary section of FIG. 2 taken along line 10—10.
Figure 11:
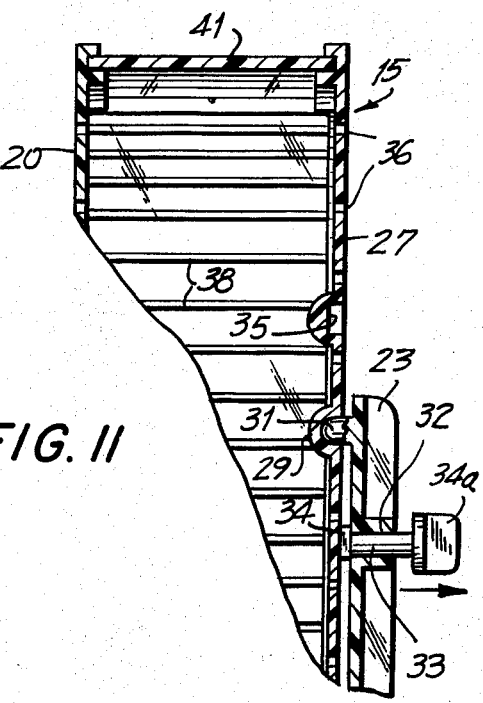
FIG. 11 is a fragmentary section showing a portion of FIG. 1 with the locking pin in disengaged position and the housing in a non-operative position.
Figure 13:
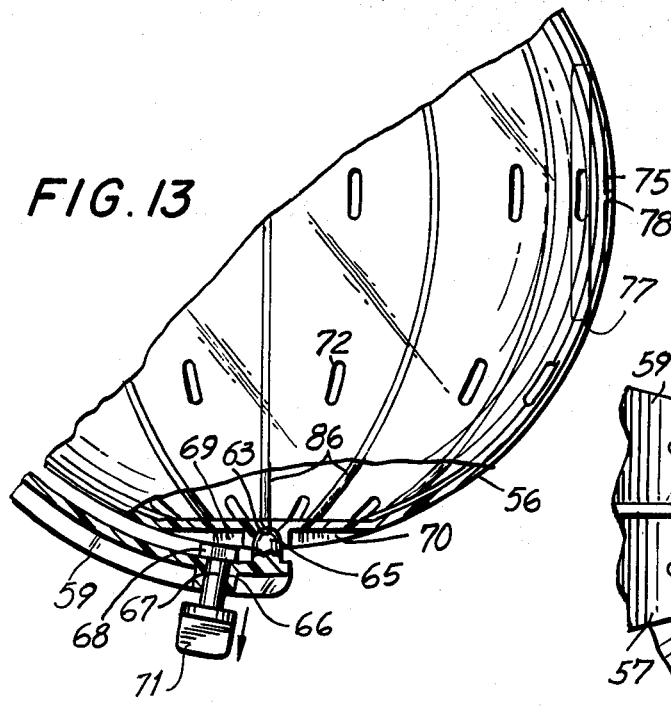
FIG. 13 is a fragmentary section showing a portion of FIG. 5 with the locking pin in retracted position.
Figure 12:
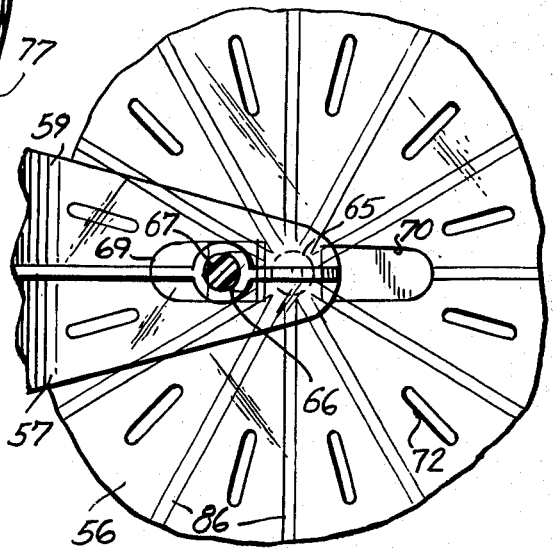
FIG. 12 is a fragmentary elevation taken in the direction of arrows 12—12 of FIG. 5.

As shown in FIGS. 1, 5 and 6, the bracket 57 is mounted on the horizontal branch 79 of the T-conduit 80 which is connected, by the bayonet collar 81 substantially in the manner aforesaid, to the tower 18 which in turn is mounted on the lower part of the said enclosure member 17. The port 83 at the end of the said branch 79 is part of the channel 84, said port 83 being proportioned and adapted for positioning in congruent relation to said port 61 of said bracket base 60. Said ports 61 and 83 are connected by the bayonet connector collar 85, substantially in the manner hereinabove described with reference to said bayonet collar 53.

The arrangement is such that when the door 73 is in its open position, with its said door 75 removed, as shown in FIGS. 5 and 6, the interior of said revolving housing 56 is in communication, through its said gate 73, with the interior of said enclosure 17 through the latter's tower 18 and T-conduit 80. When the said locking pin 67 is operatively retracted, the door 75 can be readily applied to the apertured portion 74 of said doorway 73, as shown in FIG. 9, whereby, as in the case of the unit 15 above described, egress of an animal contained within the housing 56 is prevented. The animal, by a treadmill action applied to the inner circumferencial ribs 86 in the manner aforesaid, will cause a rotation of the housing while the unit is connected to the enclosure structure 17 and its said conduit components. Should it be desired to remove the unit 16, the said bayonet collar 85 is operatively disconnected from the two ports 61 and 83, whereupon the unit can be transferred to a flat surface 87 by setting the said annular flat-bottomed base 60 thereon.

As will be noted from FIG. 5, the open doorway 73 is in operative position and the ports 61 and 83 are in communication. In this position the locking pin 67 is interengaged with the locking recess 69, whereby the globular housing 56 is held against rotation. Should it be desired to lock the housing in a diametrically opposite position, the pin 67 is operatively retracted and the housing rotated 180 degrees, whereupon the locking recess 70 will be brought into operative relation with the said pin 67 which can then be moved into engagement with the said recess 70. In this way the housing will be immovably maintained in position with respect to the bracket 57.

The congruent relationship between the doorway 39 and the port 25 in the base 24 of the bracket 21 in the cylindrical embodiment, and between the doorway 73 and the port 61 in the base 57 of the globular embodiment, facilitates egress and ingress of an animal even when the brackets are disconnected from the enclosure 17 and the apparatus used as independent devices, since the said ports in the respective brackets serve as convenient guides for the animal's movement in and out of the housing. Without such guided movements it would be more difficult for the animal to find its way or be guided into the housing, or be directed in a straight line out of the housing, especially in view of the curved configuration of the wall containing the gate.

In the above description, the invention has been disclosed merely by way of example and in preferred manner; but obviously many variations and modifications may be made therein. It is to be understood, therefore, that the invention is not limited to any particular form or manner of practicing same.

We claim:

1. A play apparatus for animal pets comprising a rotatable housing, a doorway in a wall of said housing, a door operatively associated with said doorway, a bracket rotatably supporting said housing having an open port therein, said housing being rotatable into an operative position at which said doorway is in congruent communicating relation with said open port, said bracket having releasable stop means engageable with said housing to hold it against rotation when it is at said operative position, an enclosure having a channel member with a terminal port in communication with the interior of the enclosure, and means for detachably connecting said channel member and said bracket at the regions of said respective ports to hold said ports in congruent intercommunicating relation, whereby when said doorway is open and in said operative position the interior of said housing will be in communication through said doorway with the interior of said enclosure, said door being proportioned for closing relation with said doorway, thereby to close off communication between the interiors of said housing and said enclosure.

2. An animal play apparatus according to claim 1, said housing being of cylindrical configuration comprising a cylindrical wall flanked by two lateral walls, said doorway being disposed in said cylindrical wall.

3. An animal play apparatus according to claim 1, said housing being of globular configuration comprising a spherical wall, said doorway being disposed in said spherical wall.

4. An animal play apparatus according to claim 1, said bracket having two oppositely disposed arms connected by a base, said open port being disposed in said base, said arms having coactively disposed pins in rotatable supporting engagement with said housing.

5. A play apparatus for animal pets comprising a rotatable housing, a doorway in a wall of said housing, a door operatively associated with said doorway, a bracket having two oppositely disposed arms connected by a base, said arms having coactively disposed pins in rotatable supporting engagement with said housing, a port in said base, said housing being rotatable into a position at which said doorway is aligned in communication with said port, releasable stop means slidably supported by one of said arms, said housing having a recessed stop portion therein positioned and proportioned for operatively receiving therein said stop means to hold the housing against rotation with said doorway aligned in communication with said port.

6. A play apparatus for animal pets according to claim 6, said housing being of cylindrical configuration comprising a cylindrical wall flanked by two lateral walls, said doorway being disposed in said cylindrical wall, said recessed stop portion being disposed in one of said lateral walls.

7. A play apparatus for animal pets according to claim 5, said housing being of globular configuration comprising a spherical wall, said doorway being disposed in said spherical wall, said arms being of arcuate configuration, said housing having diametrically opposite axial recesses therein in rotatable engagement with said respective pins, said recessed stop portion comprising two sections extending radially on opposite sides of one of said axial recesses, said stop means being positioned and proportioned for operative engagement with said respective sections at positions of said housing 180° apart.

8. A play apparatus for animal pets according to claim 5, said housing being of cylindrical configuration comprising a cylindrical wall flanked by two lateral walls, said doorway being disposed in said cylindrical wall, said lateral walls having peripheral track means at said doorway, said door being slidably movable along said track means into respective open and closed positions.

9. A play apparatus for animal pets according to claim 5, said housing being of globular configuration comprising a spherical wall, said doorway being disposed in said spherical wall, said door being detachably secured to said gate.

10. A play apparatus for animal pets according to claim 5, said base having a flat bottomed portion, whereby the device may be set on a flat surface with said bracket arms in an upright position.

* * * * *

UNITED STATES PATENT AND TRADEMARK OFFICE
CERTIFICATE OF CORRECTION

PATENT NO. : 3,994,262
DATED : November 30, 1976
INVENTOR(S) : Bernard Suchowski et al It is certified that error appears in the above-identified patent and that said Letters Patent are hereby corrected as shown below:

Abstract, line 6, "gate" should be --doorway--.

Col. 1, line 8, "housing" should be --housings--.

Col. 2, line 26, after "pin" insert --in--.

Col. 2, line 61, "unit" should be --units--.

Col. 4, line 49, "door" should be --doorway--.

Col. 4, line 52, "gate" should be --door--.

Claim 6, Col. 6, line 26, "6" should be --5--.

After Item 73 insert: --The entire term of this patent has been dedicated to the Public.--

Signed and Sealed this

Twenty-fourth Day of May 1977

[SEAL]

Attest:

RUTH C. MASON
*Attesting Officer*

C. MARSHALL DANN
*Commissioner of Patents and Trademarks*